United States Patent

Bullock et al.

[11] Patent Number: 5,488,478
[45] Date of Patent: Jan. 30, 1996

[54] METHOD AND APPARATUS FOR MEASURING THE SHAPE OF A SURFACE OF AN OBJECT

[75] Inventors: John D. Bullock, High Close, Wales; Norman W. Williams, Neath, Great Britain

[73] Assignee: British Steel PLC, London, Great Britain

[21] Appl. No.: 290,811

[22] PCT Filed: Feb. 15, 1993

[86] PCT No.: PCT/GB93/00309

§ 371 Date: Oct. 3, 1994

§ 102(e) Date: Oct. 3, 1994

[87] PCT Pub. No.: WO93/16353

PCT Pub. Date: Aug. 19, 1993

[30] Foreign Application Priority Data

Feb. 18, 1992 [GB] United Kingdom ............... 9203448

[51] Int. Cl.[6] .................. G01B 11/30; G01B 11/24
[52] U.S. Cl. .............. 356/376; 356/371; 250/559.22
[58] Field of Search .................. 356/371, 376; 250/559.05, 559.07, 559.08, 559.22, 559.23, 559.27, 559.45, 559.46, 559.48

[56] References Cited

U.S. PATENT DOCUMENTS

| | | | |
|---|---|---|---|
| 4,846,576 | 7/1989 | Maruyama et al. | 356/376 |
| 4,929,846 | 5/1990 | Mansour | 356/371 |
| 5,056,922 | 10/1991 | Cielo et al. | 356/376 |
| 5,251,010 | 10/1993 | Maltby, Jr. | 356/371 |

FOREIGN PATENT DOCUMENTS 2077912 12/1981 United Kingdom.

*Primary Examiner*—F. L. Evans
*Attorney, Agent, or Firm*—Kinney & Lange

[57] ABSTRACT

Apparatus for measuring the shape of a surface of, for example, a metal strip moving over a support surface comprises a laser operable to direct onto the surface of the moving strip a plurality of light beams. From these laser-generated light beams a plurality of light patterns are produced each of which is scanned across the width of the strip and is spaced from the other light patterns in the direction of strip movement. An array of line-scan cameras extends across the width of the strip and is positioned to view and record the projected light patterns. Recorded data from the camera array is processed in parallel to provide a measure of the shape of the strip surface.

6 Claims, 4 Drawing Sheets

METHOD AND APPARATUS FOR MEASURING THE SHAPE OF A SURFACE OF AN OBJECT

This invention relates to a method of determining the shape of objects and to apparatus for use therewith. More especially, the invention concerns methods of and apparatus for determining the manifest flatness of sheets and strips of metallic material, e.g. steel.

Steel strip and sheet (hereinafter referred to collectively as "steel strip") is conventionally produced by hot or cold rolling a semi-finished product (eg a bar) in a multi-stand rolling mill. The flatness of steel strip so produced is, of course, potentially of importance to the end user. The measurement of strip flatness is, however, hindered by the high operational speeds of conventional rolling mills. There is, consequently, a need for a method of and apparatus for rapidly measuring the flatness of the strip leaving a rolling mill.

One technique which has been commonly employed is that of illuminating the strip with a laser generated light beam and observing the position of the beam on the strip with a television area camera. The computing power required to analyse a television picture rapidly is, however, considerable and costly. Also, with less rapid computing power, the interval between measurements is likely to be much longer than is desirable to provide a true indication of flatness.

It is an object of the present invention to provide a method of and apparatus for rapidly measuring the shape of an object, especially the manifest flatness of a strip of steel or other material.

According to a first aspect of the present invention there is provided apparatus for measuring the shape of a surface of an object, the apparatus being characterised by laser means operable to direct onto a surface of an object moving relative to the laser means a plurality of light beams spaced one from another in the direction of movement of the object to produce on the object surface a plurality of light patterns which extend across the object in a direction generally normal to the direction of movement of the object, scanning means for scanning the laser-generated light beams continuously across the object surface in a direction generally normal to the direction of movement of the object, and an array of line-scan cameras positioned to view and record the said light patterns and to process in parallel the recorded data to provide a measure of the shape of the object surface. Scanning may be effected by rotating or oscillating mirror assemblies. These assemblies may comprise mirror galvanometers.

The images recorded by the individual line-scan cameras of the array may be processed in parallel each to provide a measure of the height of that part of each light pattern viewed by that camera above a reference plane.

In another aspect there is provided apparatus for for measuring the shape of a surface of a metal object moving over a support surface, the apparatus being characterised by laser means operable to direct onto the surface of the moving object a plurality of light beams, means operable to produce from these laser-generated light beams a plurality of light patterns each of which extends across the width of the object and is spaced from the other light patterns in the direction of object movement, scanning means for scanning the laser-generated light beams continuously across the object surface in a direction generally normal to the direction of movement of the object, an array of line-scan cameras extending across the width of the object and positioned to view and record the said light patterns, and to process in parallel the recorded data to provide a measure of shape of the object surface.

In a further aspect, there is provided a method of measuring the shape of a surface of an object moving over a support surface, the method being characterised by the steps of directing onto a surface of an object a plurality of laser-generated light beams to produce on that surface a plurality of light patterns which extend across the object surface in a direction generally normal to the direction of movement of the object, scanning the laser-generated light beams continuously across the object surface in a direction generally normal to and across the direction of movement of the object and recording the light patterns produced using an array of line-scan cameras positioned generally normal to and across the direction of movement of the object and processing the data recorded by each line-scan camera in parallel with the other such cameras to provide a measure of the flatness of the object surface.

The invention will now be described by way of example only and with reference to the accompanying drawings in which.

Figure 1:
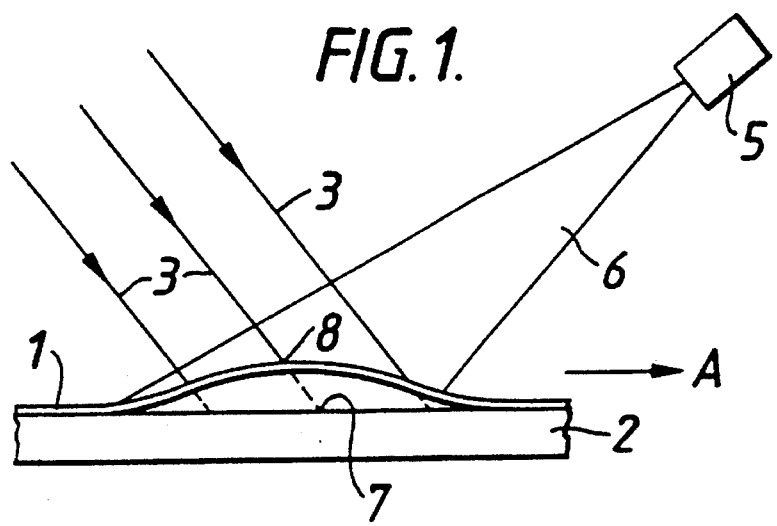
FIGS. 1 and 2 are schematic side and plan views of apparatus in accordance with the invention.
Figure 2:
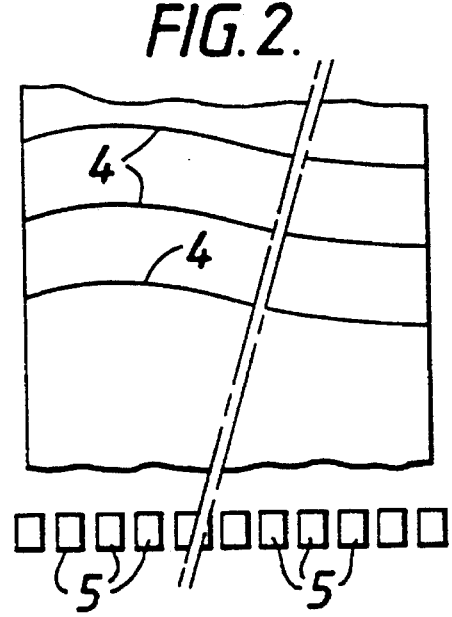
Figure 7:
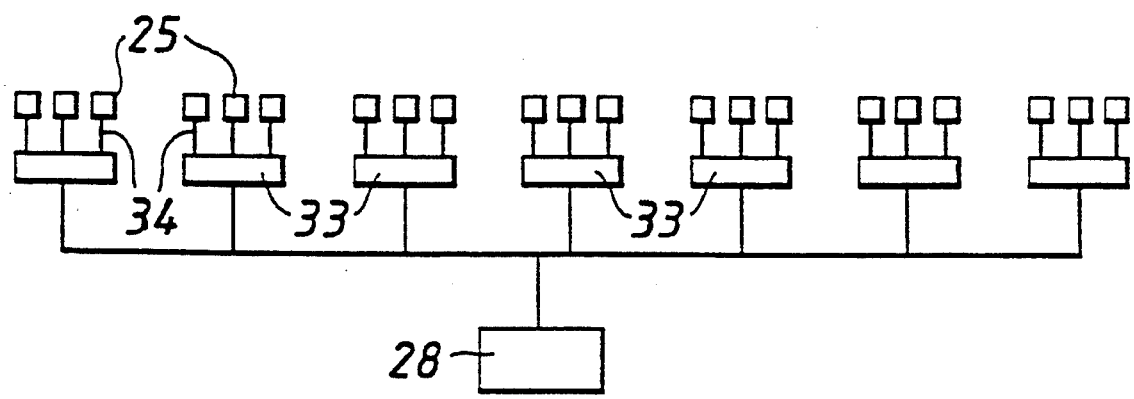

FIG. 7 schematically shows the manner in which line-scan cameras of the apparatus illustrated are linked to a processing computer;

Referring now to the drawings, FIGS. 1 and 2 schematically illustrate the method of operation of apparatus in accordance with the invention for measuring the flatness of a steel strip 1 moving in the direction of arrow A over a support surface 2. The shape of the steel strip has been exaggerated in FIG. 1 for purposes of explanation. Three laser-generated light beams 3 are projected on to the surface of the strip 1. Each light beam is scanned across the width of the strip to trace a linear light pattern. The light patterns are viewed by an array of line-scan cameras 5 which extend across the width of the strip. The angle of projection of each laser beam is inclined such that its axis subtends an angle of typically 20° to a line drawn normal to thee strip surface. The cameras 5 are inclined at approximately the same angle so that the optical axis of each camera lies typically 20° to a line drawn normal to the strip surface. As the strip 1 moves over the support 2 its surface rises and falls relative to the support surface 2 because inter alia of unevenness in the strip surface. With a truly flat strip surface, the light pattern 4 would be seen by the respective camera at position 7 of FIG. 1; with a strip configuration as shown, however, the light pattern is seen by the camera at position 8. Thus, the instantaneous height of the strip at any given position can be measured by appropriately processing the image data received by the cameras 5 with reference to an arbitary reference plane and previous calibration. More especially instantaneous heights of the strip surface are recorded to provide a measure of the linear distance (ie filament length) between neighbouring light patterns.

By taking a series of measurements at regular intervals across the width of the strip by means of the camera array 5, overall flatness of the strip can be determined One advantage of employing a plurality of laser beams is that simultaneous measurements at three lengthways spaced locations can be taken to enable height differences to be determined by parallel processing; the measurements taken will of course be affected by general vertical movements of the strip in addition to localised variations in strip flatness. Because any overall vertical movement of the strip caused, for example, by flutter will result in similar horizontal movements of the light patterns produced by the laser beams, such general movements can be cancelled out readily during processing. It will be appreciated, therefore, that the images produced by the on-line camera array 5 can be processed to define accurately the relative positions of the lines of light 4 produced by the individual laser beams 3 and from this data the flatness of the strip can be determined.

The laser beams 3 are conveniently generated from a single laser and are scanned across the width of the strip by a rotating or oscillating mirror system e.g. a mirror galvanometer. Alternatively, a line generator or a multiplicity of separate lasers may be provided each being pulsed to provide an ON/OFF light pattern.

Figure 3:
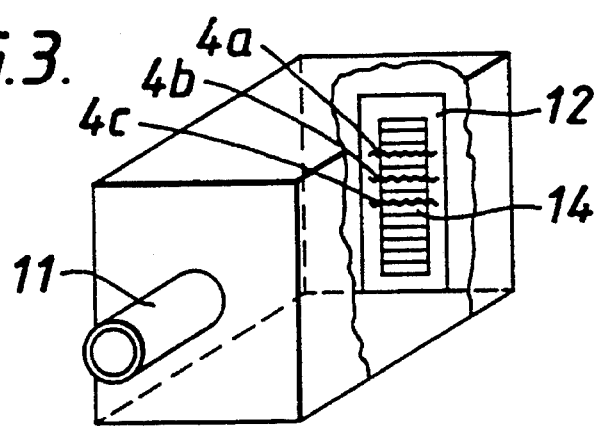
FIG. 3 is a diagrammatic perspective view partly in section of a line scan camera forming part of the apparatus illustrated in FIGS. 1 and 2.

Turning now to FIG. 3, each line-scan camera 5 includes a lens 11 which receives light reflected from that part of the strip surface contained within the restricted "line" of scan 6 and focuses this reflected light onto a receiving surface 12 comprising an array 14 of light sensitive material. Images of the light patterns received on the receiving surface 12 are shown at 4a, 4b and 4c.

The linear light sensitive arrays 14 are typically conventional charge coupled devices and the positions of each light pattern 4a, 4b, 4c, is determined by reference to the pixels of the array 14 which are activated by the respective light pattern. Each linear array 14 is separate from the arrays of the other cameras and the outputs from the several linear arrays are processed in parallel using electronic hardware. This means that processing time is reduced significantly.

Figure 4:
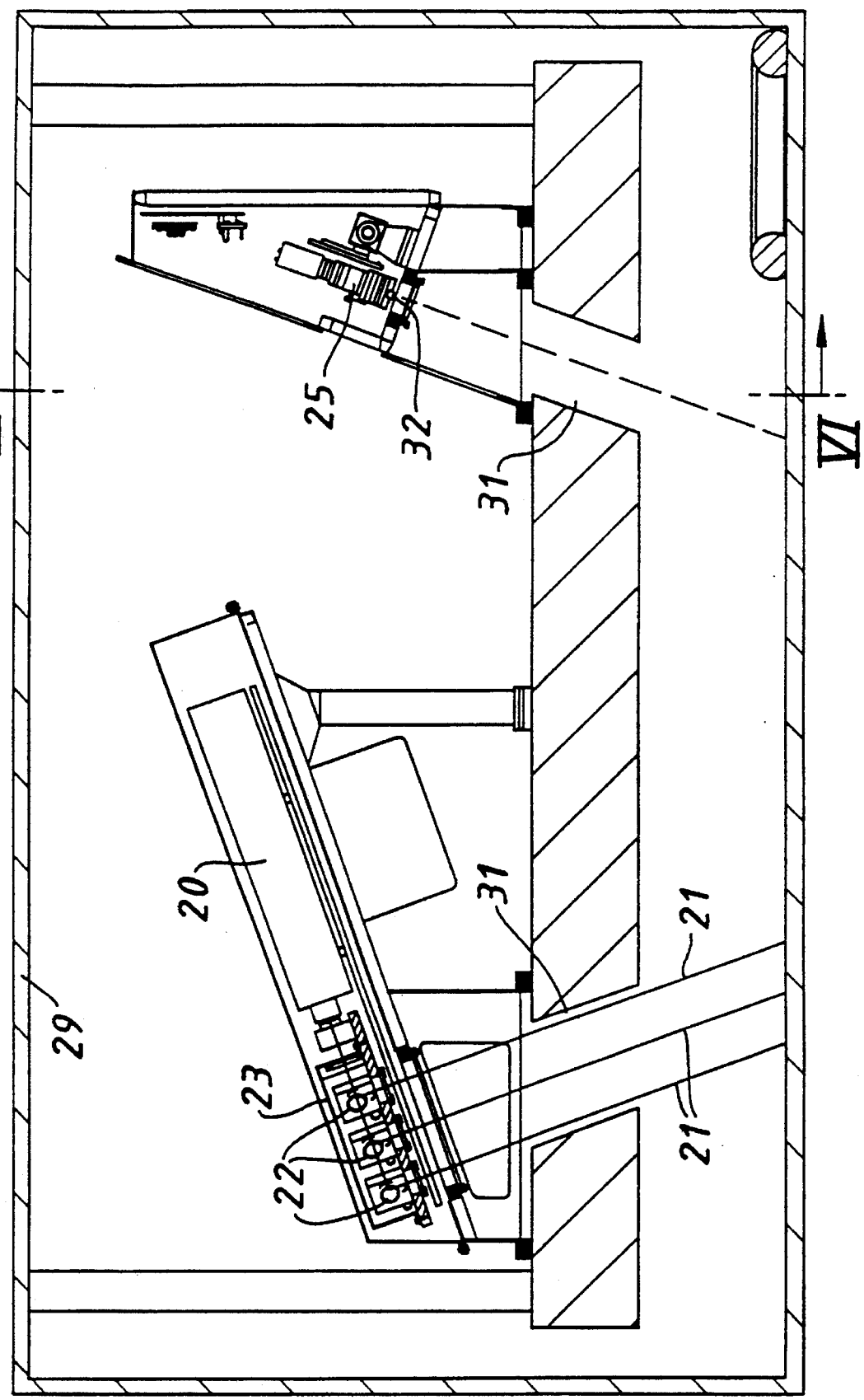
FIGS. 4 and 5 are respectively side elevational and plan views partly in section of apparatus in accordance with the invention positioned above a roller table of a rolling mill.
Figure 5:
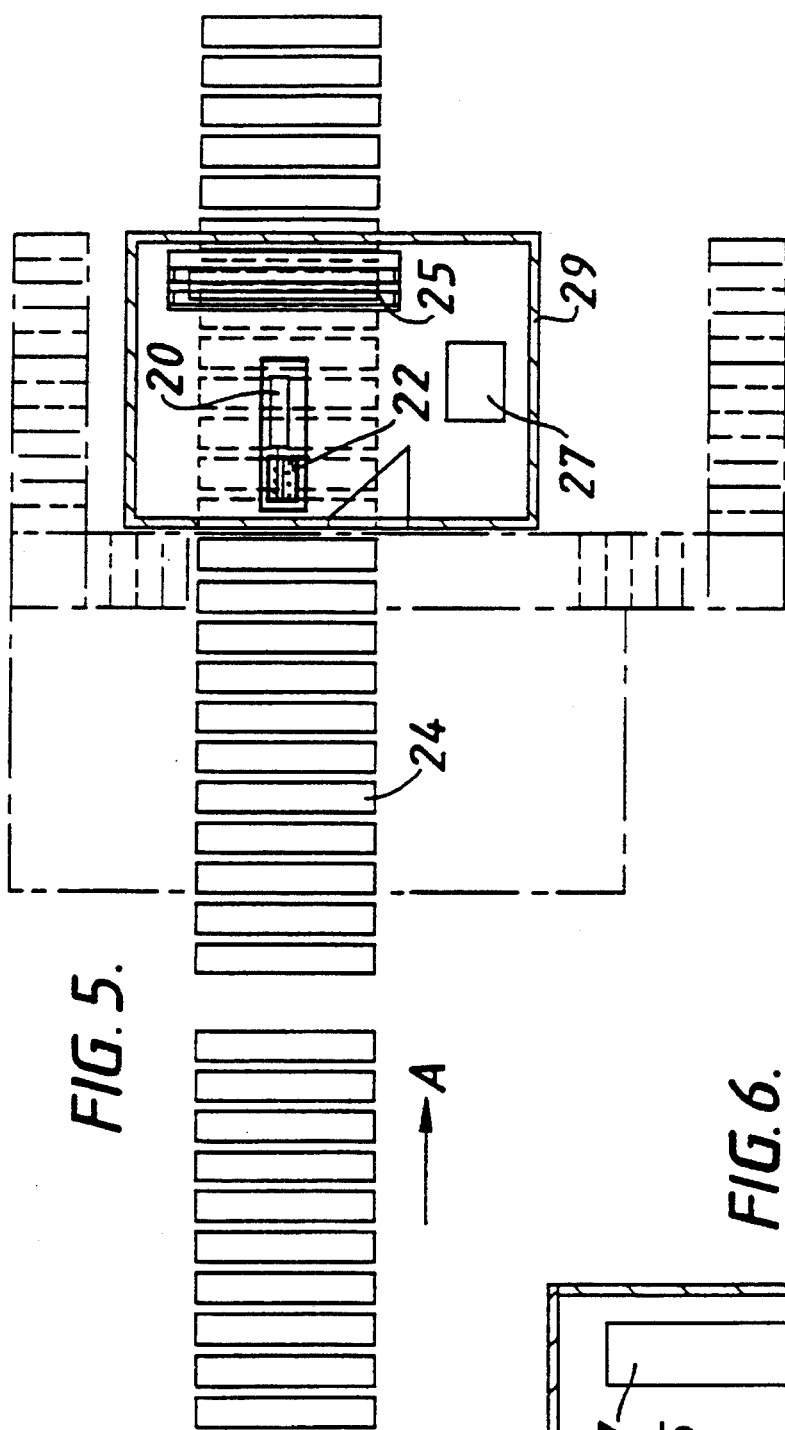
Figure 6:
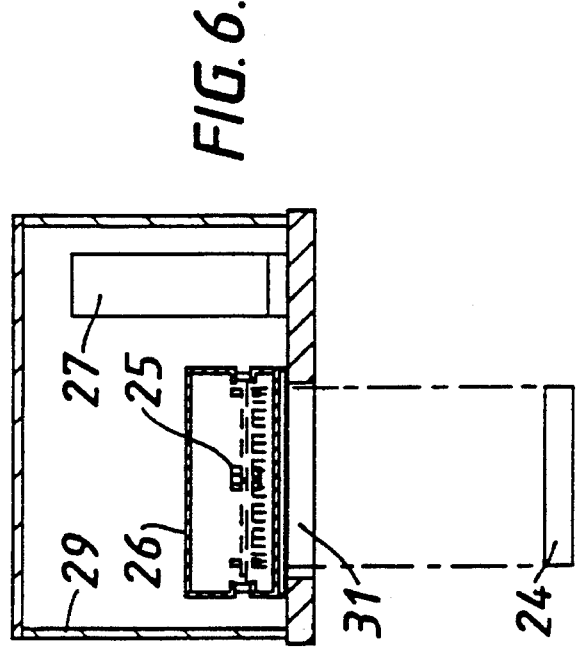
FIG. 6 is a section along line VI—VI of FIG. 4 to a reduced scale.

One particular arrangement of apparatus in accordance with the invention is shown in FIGS. 4 to 6. A laser 20 has its beam divided into three separate beams 21 each of which is scanned across the width of the strip, by one of three mirror galvanometer scanners 22 located within a dust-proof enclosure 23. The strip 1 is moved along a roller table 24 in the direction indicated by arrow A and light reflected from the strip surface is received by an array of line-scan cameras 25 including optical sensors located within a housing 26. The laser 20 is typically a four watt argon ion laser and there are typically twenty-one line scan cameras 25 (only some of which are illustrated in FIG. 6) placed evenly across the width of the roller table 24. Each line scan camera 25 is typically fitted with a F2.8 200 mm focal length lens to enable height changes of up to 250 mm to be measured. Each line scan camera typically has 2048 pixels to enable sub-millimetric resolutions of height.

The assembly of the laser 20, the scanners 22, the line scan camera array 25 and associated electronics 27 are positioned typically 3 m above the roller table 24 at the exit of a hot rolling mill. The outputs of the line-scan cameras 25 are linked for parallel processing to a control computer 28 (see FIG. 7) situated some distance away in an instrumentation room. All of the equipment positioned above the roller table 23 is housed in a water-cooled or refrigerated casing 29 formed in its undersurface with windows 31 for the passage of the lasers 21 onto the strip surface and reflected light from that surface to the cameras 25.

In use, because the strip surface is reasonably reflective, any angular changes in it away from the specular (due to shape waves or "flutter") will cause the intensity of the individual "stripes" (ie. patterns) produced by the laser beams 21 on the strip surface to vary. Over the range of measurement envisaged the intensity may vary several hundred times. Because this may fall outside the dynamic range of the cameras 25, it is necessary to use a sufficiently powerful laser to ensure that the signal is not too small to measure when the strip angle to the horizontal is large. A consequence of this is that when the strip angle is near the specular the signal is many times over-saturated and it is necessary to use linear arrays with 'anti-blooming' to avoid distortion of the signal and ensure accurate measurements at all times.

The laser "stripes" are typically 125 mm apart (250 mm between the outermost ones) in the direction of travel of the strip and this separation determines the sampling frequency along the rolling direction and hence the minimum wavelength shape which can be measured. This separation gives five measurement points per wavelength at 500 mm (the design minimum). To ensure full coverage of the strip a camera reading should be made every 250 mm of strip travel. This is equivalent to a reading about every 14 mS at the maximum strip speed of the mill, 18 m/s.

As the strip speed varies with product grade and rolling practice the computer monitors changes in strip speed and effects an appropriate alteration in the integration times of the cameras. So that the laser spots only cross the fields of view of the cameras 25 once per integration period the scanners 22 are synchronised to the cameras 25. The scanners 22 are driven by a sawtooth waveform whose amplitude can be adjusted to suit the width of the strip being rolled. During the flyback period each camera 25 can be disabled electronically so that the spots are not seen. Since the laser spots cross the fields of view of each camera 25 very quickly (around 50 micro seconds) any motion blur due to movement of the strip surface is virtually eliminated.

Since strip leaving a hot rolling mill is red hot as it passes below the casing 29, radiation from the strip surface is blocked by fitting each camera 25 with a dichroic bandpass filter 32 which is centred on the laser wavelength (about 500 nm). If such a filter is not fitted the cameras become saturated by background radiation, since they have peak sensitivity at about 800 nm.

As indicated schematically in FIG. 7, the cameras 25 are linked to the computer 28, three at a time, via seven interface boards 33. These boards 33 threshold the analogue camera signals 34 in circuitry to produce binary video signals which are fed into edge detection circuitry. Since this processing is done in hardware and in parallel it is very fast. The edges, which are transitions above a programmable threshold set on an input, are stored in a FIFO buffer (first in/first out hardware buffer) and correspond to the positions of the laser "stripes" in the field of view of the cameras.

At the end of each camera integration period an interrupt is generated and the edge readings are read from the seven interface board FIFO buffers by the computer 28 via a data base. These edge readings are then filtered in software to remove invalid data and are used to estimate the lengths of surface filaments (ie linear distance between laser generated pattern 1) on the strip for each valid camera. Since the strip width is likely to vary and is unlikely entirely to fill the complete width of the roller table 24 some of the cameras 25 will not see all three "stripes". Software ignores readings from these cameras. The estimated filament lengths (ie the distance between the respective light patterns 4) are then integrated over a preset length of strip and used to calculate parameters from which the flatness of the strip can be determined.

Advantages of line scan cameras over area cameras include the fact that line-scan cameras have relatively higher resolution than area cameras and for accurate measurement when using area cameras it is necessary to use interpixel interpolation techniques which further absorb processing time. Furthermore area cameras have considerably more data to read per integration period than line scan cameras and therefore their operational speed is significantly reduced. Area cameras are normally only required to work at a TV frame rate which is slower than is required in practice for a steel strip mill which may require up to 80 Hz operation. Area cameras also produce a lot of redundant information and finally the anti-blooming performance of area array cameras is not as good as line scan cameras.

Whereas the foregoing describes the invention in the context of detecting the flatness of metal strip, apparatus in accordance with the invention can be employed for detecting the surface shape of, for example, tubes, rolled sections, profiled sections and the like.

It will be understood that the foregoing is merely exemplary of apparatus and methods in accordance with the invention and that modifications can readily be made thereto without departing from the true scope of the invention as defined by the appended claims.

We claim:

1. Apparatus for measuring the shape of a surface of an object, the apparatus comprising:

laser means operable to direct onto a surface of an object moving relative to the laser means a plurality of light beams spaced one from another in the direction of movement of the object to produce on the object surface a plurality of light patterns which extend across the object in a direction generally normal to the direction of movement of the object;

scanning means for scanning the laser-generated light beams continuously across the object surface in a direction generally normal to the direction of movement of the object; and an array of line-scan cameras positioned to view and record the said light patterns and to process in parallel data representative of the recorded light patterns to provide a measure of the shape of the object surface.

2. Apparatus as claimed in claim 1 wherein the scanning means comprises a rotating or oscillating mirror assembly.

3. Apparatus as claimed in claim 2 wherein the mirror assembly comprises a plurality of mirror galvanometers.

4. Apparatus for measuring the shape of a surface of a metal object moving over a support surface, the apparatus comprising:

laser means operable to direct onto the surface of the moving object a plurality of light beams;

means operable to produce from these laser-generated light beams a plurality of light patterns each of which extends across the width of the object and is spaced from the other light patterns in the direction of object movement;

scanning means for scanning the laser-generated light beams continuously across the object surface in a direction generally normal to the direction of movement of the object; and an array of line-scan cameras extending across the width of the object and positioned to view and record said light patterns, and to process in parallel data representative of the recorded light patterns to provide a measure of shape of the object surface.

5. Apparatus as claimed in claim 4 wherein the support surface comprises a roller table positioned to receive metal strip from a rolling mill.

6. A method of measuring the shape of a surface of an object moving over a support surface, the method comprising:

directing onto a surface of an object a plurality of laser-generated light beams to produce on that surface a plurality of light patterns which extend across the object surface in a direction generally normal to the direction of movement of the object;

scanning the laser-generated light beams continuously across the object surface in a direction generally normal to the direction of movement of the object;

recording the light patterns produced using an array of line-scan cameras positioned generally normal to and across the direction of movement of the object; and processing data representative of the light patterns recorded by each line-scan camera in parallel with the other such cameras to provide a measure of the flatness of the object surface.

* * * * *